US012571251B2

(12) United States Patent
Zhang

(10) Patent No.: US 12,571,251 B2
(45) Date of Patent: Mar. 10, 2026

(54) TOP RAIL MOUNTING ASSEMBLY AND BLIND

(71) Applicant: Huixue Zhang, Hubei (CN)

(72) Inventor: Huixue Zhang, Hubei (CN)

( * ) Notice: Subject to any disclaimer, the term of this patent is extended or adjusted under 35 U.S.C. 154(b) by 200 days.

(21) Appl. No.: 18/500,097

(22) Filed: Nov. 1, 2023

(65) Prior Publication Data

US 2024/0060360 A1 Feb. 22, 2024

(30) Foreign Application Priority Data

Aug. 22, 2023 (CN) ......................... 202322272224.5

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC ... E06B 9/322; E06B 2009/3222; E06B 9/323
See application file for complete search history.

(56) References Cited

U.S. PATENT DOCUMENTS

2010/0206492 A1* 8/2010 Shevick .................... E06B 9/30 160/170
2014/0305601 A1* 10/2014 Mullet ...................... E06B 9/62 160/170
2015/0028144 A1* 1/2015 Defenbaugh ........... E06B 9/322 242/378.4

FOREIGN PATENT DOCUMENTS

| | | | |
|---|---|---|---|
| CN | 200966539 | Y | 10/2007 |
| CN | 203066819 | U | 7/2013 |
| EP | 2867434 | B | 10/2017 |

* cited by examiner

*Primary Examiner* — Christine M Mills
(74) *Attorney, Agent, or Firm* — SHIMOKAJI IP

(57) ABSTRACT

A top rail mounting assembly includes a power mechanism, a driving mechanism, a winding mechanism, and a positioning mechanism. The power mechanism includes multiple power boxes arranged in a housing in a predetermined direction, each power box includes a box body and an elastic assembly configured inside the box body. The driving mechanism includes a driving rod and a driving assembly interlinked together, with the driving rod passing through each power box which is interlinked with the driving rod. The winding mechanism is connected to the driving assembly and interlinked with the power boxes through the driving assembly and the driving rod. The positioning mechanism is movably installed inside the housing for positioning the slats in any position. The top rail mounting assembly can ensure smooth operation during folding and unfolding of the blind.

9 Claims, 10 Drawing Sheets

TOP RAIL MOUNTING ASSEMBLY AND BLIND

FIELD OF THE INVENTION

The present invention relates to the technical field of blinds, and particularly to a top rail mounting assembly and a blind having the same.

BACKGROUND OF THE INVENTION

Blinds are commonly used for sun shading and ventilation in both indoor and outdoor settings. Unlike curtains, the blinds are made of materials such as wood, glass, or aluminum alloy, which provide resistance against sunlight, rain and dust, and are easy to clean. In addition to blocking UV radiation, the blinds can also adjust the indoor lighting, and may offer better ventilation and privacy. When fully closed, the blinds may also provide sound insulation and thermal insulation. In view of these reasons, the blinds are increasingly used in homes, offices, and other spaces.

In existing installations, multiple blinds are often used for large windows, thus it's required to fold or unfold multiple blinds for lighting or shading, which can be cumbersome. For a window located on a single wall, a single blind can be used for convenience. However, as the size of the blind increases, its weight also increases, which makes it difficult to operate smoothly with existing top rail mounting assembly. That is to say, the existing top rail mounting assembly cannot meet the requirements for the normal use of larger blinds.

Therefore, there is a need to provide an improved top rail mounting assembly that is suitable for blinds with larger size to ensure smooth operation.

SUMMARY OF THE INVENTION

One objective of the present invention is to provide a top rail mounting assembly adapted for blinds with large size, ensuring smooth operation during folding and unfolding.

Another objective of the present invention is to provide a blind including the top rail mounting assembly.

To achieve the above-mentioned objectives, the present invention provides a top rail mounting assembly adapted for a blind. The blind includes a driving cord and multiple slats connected to the driving cord, and the top rail mounting assembly includes: a power mechanism, including multiple power boxes arranged in a housing in a predetermined direction, each power box including a box body and an elastic assembly configured inside the box body; a driving mechanism, including a driving rod and a driving assembly interlinked together, and the driving rod passing through each power box which is interlinked with the driving rod; a winding mechanism for winding the driving cord, connected to the driving assembly and interlinked with the power boxes through the driving assembly and the driving rod; and a positioning mechanism, movably installed inside the housing, through which the driving cord passes and then connects to the slats. When the slats are pushed or pulled, the driving cord is configured to wind on or unwind from the winding mechanism to fold or unfold the slats, the winding mechanism is configured to drive the driving assembly to move and drive the driving rod, causing the elastic assembly on the driving rod to be tightened or loosened elastically, and an elastic force released by the elastic assembly is constantly equal to a weight of the slats stacked blow.

Preferably, the positioning mechanism includes a guide wheel and a positioning member, the driving cord inside the winding mechanism is configured to pass through the guide wheel and the positioning member, and then connect to the slats.

Preferably, the positioning member is provided with a first elastic member and has a constant tendency to move closer to the winding mechanism; when a force is applied to the slats to pull the slats, the slats overcome an elastic force of the first elastic member and move downward; when the force acting on the slats is withdrawn, the first elastic member drives the positioning member to reset and increases a resistance to a downward movement of the driving cord and the slats; and the positioning member is configured to cooperate with the power boxes to allow the slats to be positioned at any position.

Preferably, the positioning member is installed inside the housing to form a cavity, the guide wheel is installed inside the cavity, one end of the positioning member is provided with a first rotating member, and another end of the positioning members is provided with a second rotating member, the first rotating member is located on one side of the guide wheel, and the second rotating member is located on another side of the guide wheel.

Preferably, the winding mechanism includes a shell and a reel vertically and rotatably installed inside the shell, one end of the reel is provided with an installation part, the driving assembly includes a first gear and a second gear meshed with one another, the first gear is sleeved on the installation part and interlinked with the reel, and the second gear is sleeved on the driving rod.

Preferably, the reel includes multiple reel sections, and each reel section is provided with an installation hole for the driving cord to pass through, one end of the driving cord is fixed inside the reel and passes through the installation hole and winds around the reel sections, then passes through the positioning mechanism, and finally connects to multiple slats.

Preferably, the elastic assembly includes a first rotating member, a second rotating member, and a second elastic member respectively arranged inside the housing; one end of the second elastic member is connected to the first rotating member, and another end of the second elastic member is connected to the second rotating member; the first rotating member is sleeved on the driving rod and interlinked with the driving rod, the second rotating member is rotatably installed inside the housing, and the second elastic member constantly tends to reset the first rotating member and the driving rod; by pushing or pulling the slats, the winding mechanism is configured to fold or unfold the slats, the first rotating member is configured to the second elastic member, and an elastic force released by second elastic member is always equal to the weight of the slats stacked below.

Preferably, the housing is provided with a fixed part, and the second rotating member is rotatably sleeved on the fixed part.

Preferably, the top rail mounting assembly further includes an adjustment mechanism for adjusting an angle of the slats, wherein the adjustment mechanism includes an adjustment rod, a rotation part, and a connecting rope, both ends of the adjustment rod are provided with the rotation part, the rotation part is connected to the slats through the connecting rope, the adjustment rod passes through the winding mechanism and the power boxes, and does not interfere with the winding mechanism and the multiple power boxes.

The present invention further provides a blind, including multiple slats connected to each other through a driving cord and a connecting rope, and the top rail mounting assembly according to claim 1, wherein the driving cord and the connecting rope are connected to the top rail mounting assembly, the top rail mounting assembly is configured to control the driving cord to fold or unfold the slats, and control the connecting rope to rotate the slats.

In comparison with the prior art, the blind of the present invention include a top rail mounting assembly, a driving cord, a connecting rope, and multiple slats. The top rail mounting assembly is particularly suitable for larger blinds. The top rail mounting assembly includes a housing, a power mechanism, a driving mechanism, a winding mechanism, a positioning mechanism, and an adjustment mechanism, all of which are installed inside the housing. The power mechanism includes multiple power boxes arranged in a predetermined direction inside the housing, each power box includes a box body and an elastic assembly installed inside the box body. The driving mechanism includes a driving rod and a driving assembly that are interconnected. The driving rod passes through multiple power boxes, and multiple elastic assemblies are linked to the driving rod. The winding mechanism is used to wind and unwind the driving cord, and connected to the driving assembly and linked to the power boxes through the driving assembly and the driving rod. The positioning mechanism is movably installed inside the housing and works in coordination with the power mechanism to position the slats at any position. The adjustment mechanism is used to adjust the angle of the slats. Specifically, the driving cord is wound around the winding mechanism, pass through the positioning mechanism, and connect to multiple slats. The driving assembly includes a first gear and a second gear that engage with each other. The first gear is connected to the winding mechanism, and the second gear is connected to the driving rod. Multiple elastic assemblies are linked to the driving rod. When the slats are pulled down, the driving cord pulls the slats and the reel to rotate to release the driving cord and the slats connected to the driving cord. At the same time, under the pulling action, the winding mechanism drives the driving rod to rotate through the driving assembly, and the elastic assemblies move with the driving rod. The first rotating member on the driving rod winds up the second elastic member, and the elastic force released by the second elastic members is always equal to the weight of the stacked slats below. When the slats are pulled down, the driving cord acts on the positioning mechanism, overcoming the elastic force of the positioning piece to continue moving downward. The positioning mechanism works in coordination with the power mechanism, allowing the slats to be positioned at any position when the force is withdrawn. On the other hand, when the slats are pushed up, the total elastic force of the multiple second elastic members and the total weight of the slats are unbalanced, and the elastic force of the second elastic members is greater than the weight of the slats. As a result, the driving rod and the reel connected to the driving assembly are driven to rotate, which allows the driving cord to be rolled up and the slats to be folded up. The top rail mounting assembly of the present invention allows the slats to be easily folded and unfolded, and the slats can be positioned at any suitable position. The top rail mounting assembly of the present invention is suitable for larger blinds, allowing the slats of the blind to be easily folded and unfolded, and the arrangement of the power boxes does not interfere with the adjustment mechanism, resulting in a compact and reasonable overall structure.

BRIEF DESCRIPTION OF THE DRAWINGS

The accompanying drawings facilitate an understanding of the various embodiments of this invention. In such drawings.

REFERENCE NUMERALS

Figure 1:
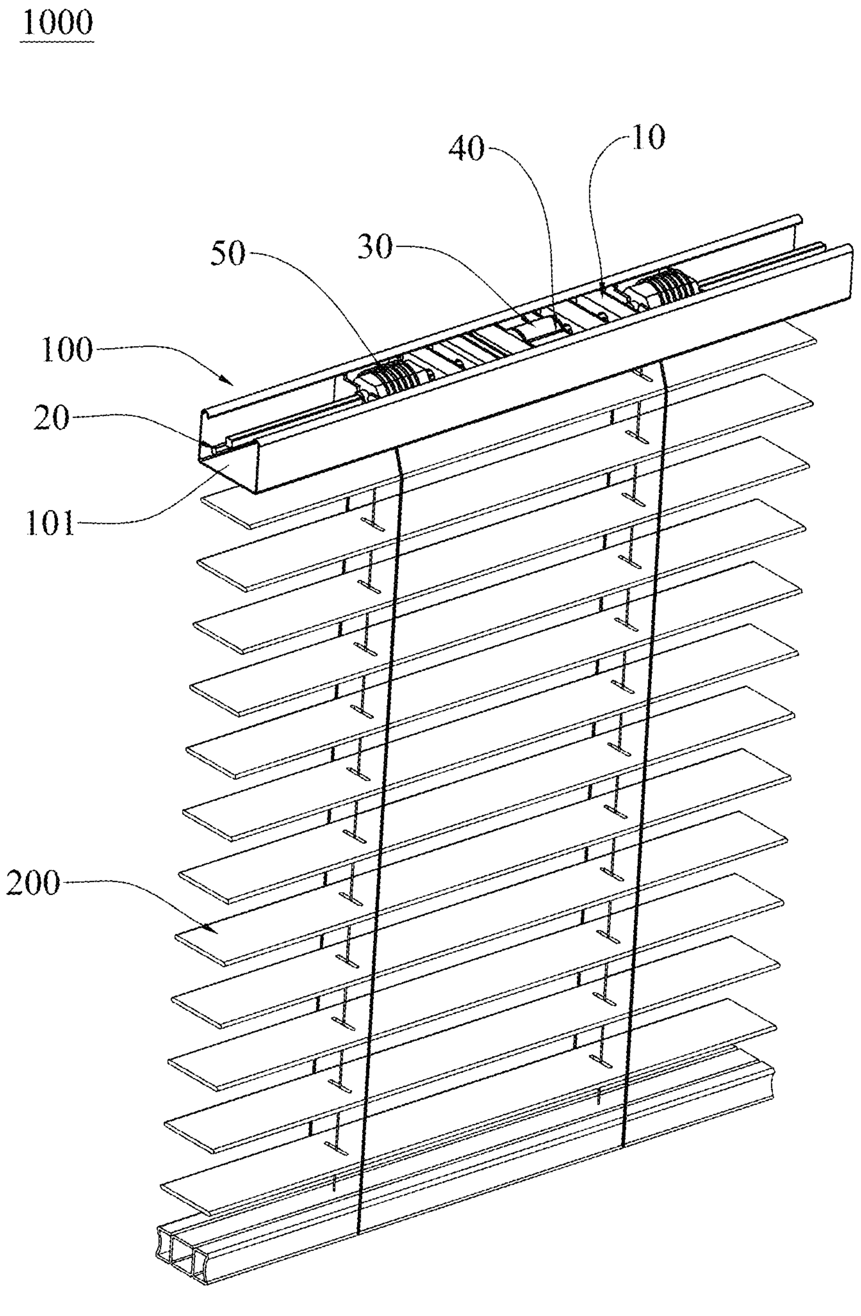
FIG. 1 is a perspective view of a blind according to one embodiment of the present invention.
Figure 2:
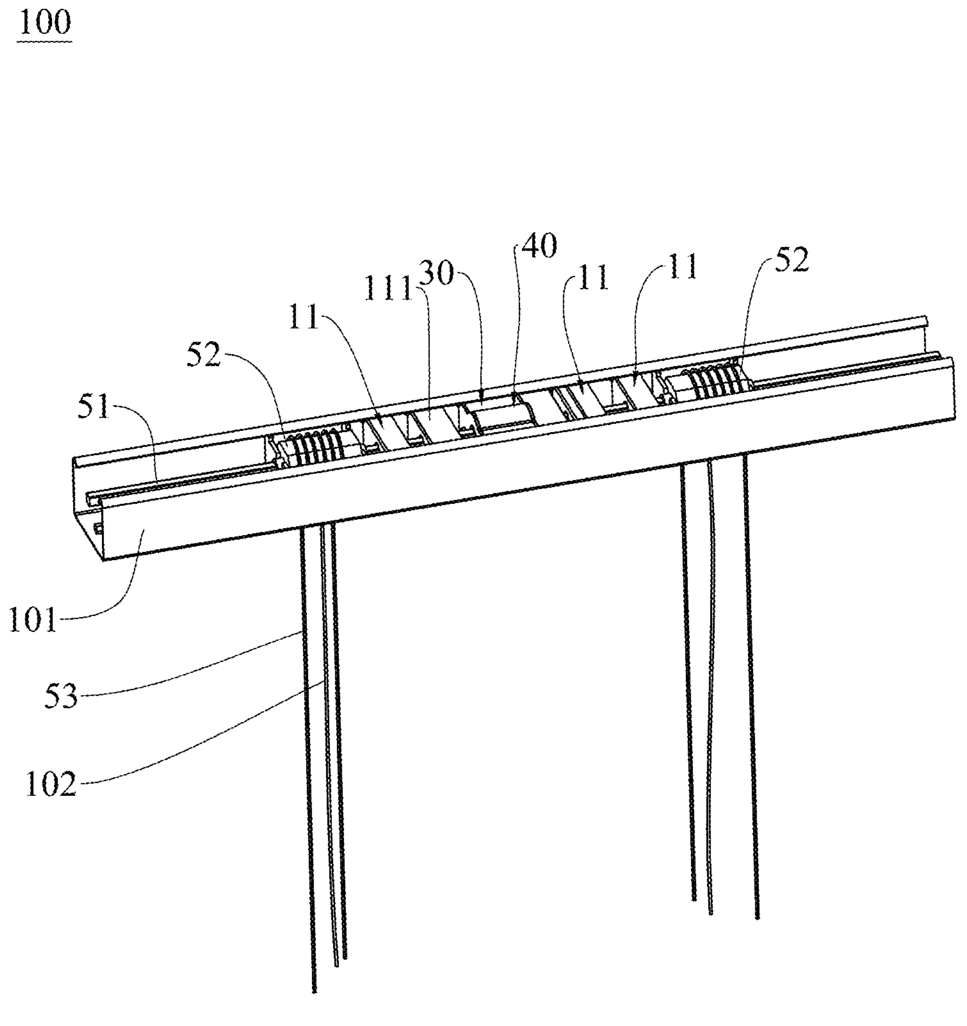
FIG. 2 is a perspective view of the top rail mounting assembly in FIG. 1.
Figure 3:
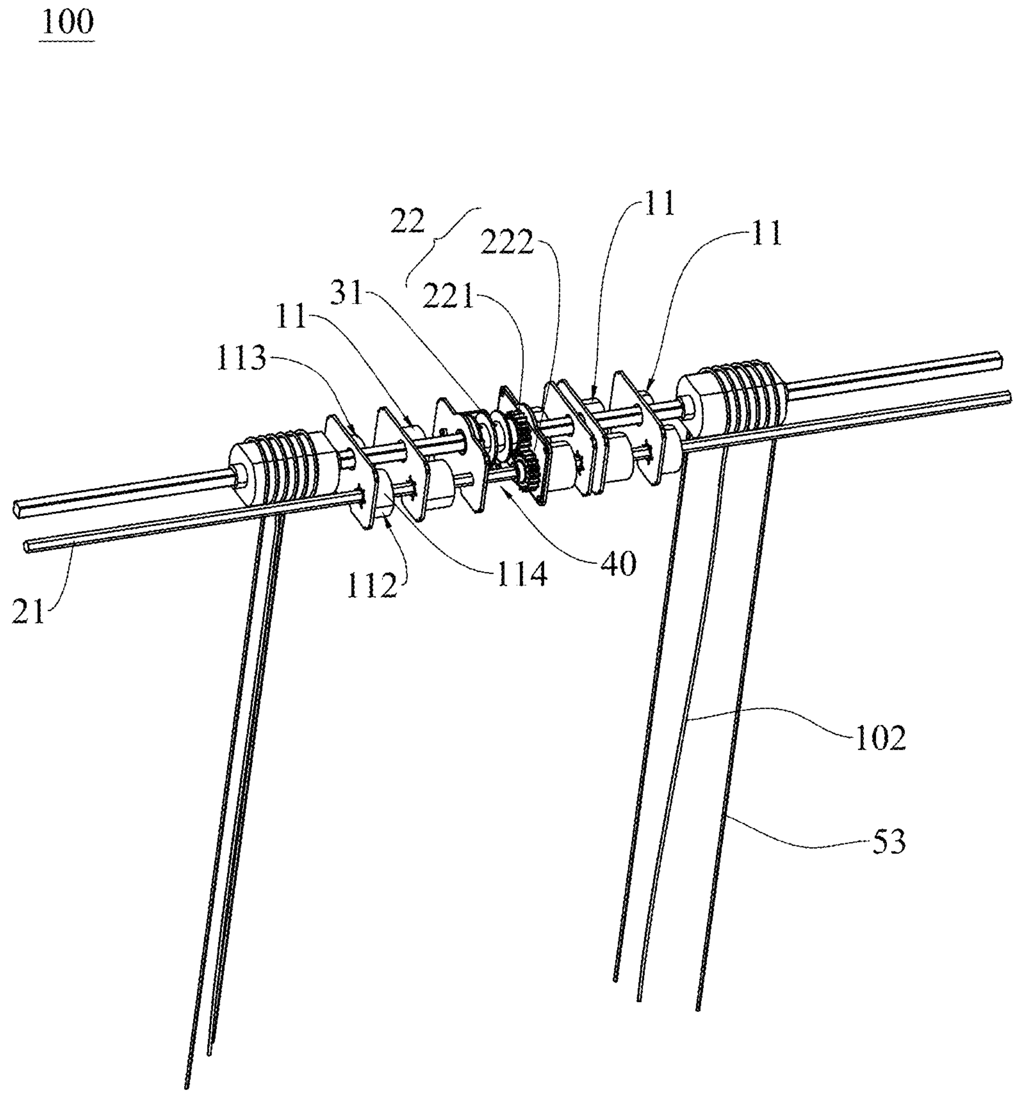
FIG. 3 is an internal structural diagram of FIG. 2 with the housing removed.
Figure 4:
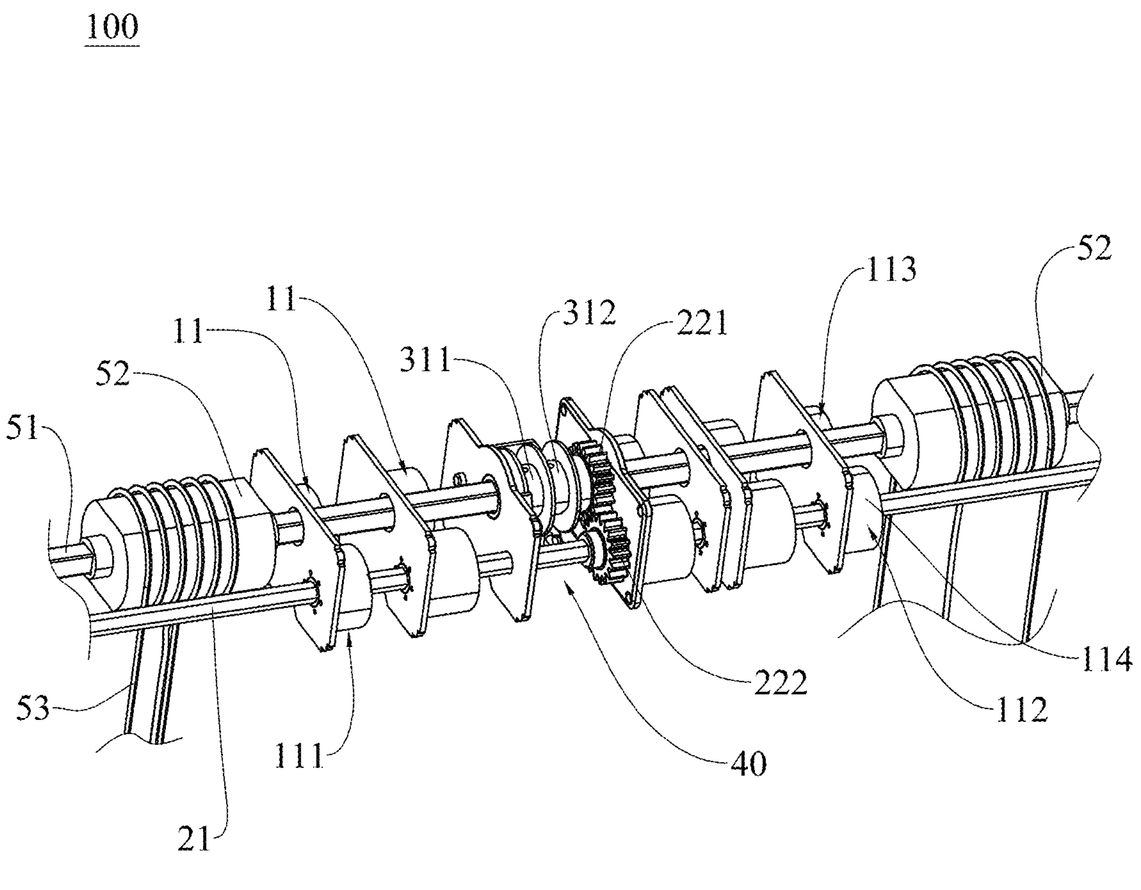
FIG. 4 is a partial perspective view of FIG. 3.

1000, blind;
100, top rail mounting assembly;
101, housing;
102, driving cord;
103, shell;
10, power mechanism;
11, power box;
110, elastic assembly;
111, box body;
112, first rotating member;
1121, third engaging portion;
113, second rotating member;
114, second elastic member;
115, fixed part;
20, driving mechanism;
21, driving rod;
211, first engaging portion;
22, driving assembly;
221, first gear;
222, second gear;
2221, second engaging portion;
30, winding mechanism;
31, reel;
311, reel section;
312, mounting hole;
313, mounting part;
40, positioning mechanism;
41, positioning member;
42, guide wheel;
43, first rotating member;
44, second rotating member;
45, first elastic member;
50, adjustment mechanism;
51, adjustment rod;
52, rotation part;
53, connecting rope;
200, slats.

DETAILED DESCRIPTION OF ILLUSTRATED EMBODIMENTS

For describing the technical content and structural features of the present invention in details, the following is a further explanation in conjunction with the embodiments and the drawings.

Referring to FIGS. 1 to 5, a blind 1000 according to the present invention includes a top rail mounting assembly 100, a driving cord 102, a connecting cord 53, and several slats 200. The top rail mounting assembly 100 allows the slats 200 to be easily folded and unfolded and positioned at any suitable angles. The top rail mounting assembly 100 is particularly suitable for large venetian blinds 1000. The top rail mounting assembly 100 includes a housing 101 and various components configured inside the housing 101 including a power mechanism 10, a driving mechanism 20, a winding mechanism 30, a positioning mechanism 40, and an adjustment mechanism 50.

Specifically, the power mechanism 10 includes multiple power boxes 11 arranged in the housing 101 in a predetermined direction, and each power box 11 includes a box body 111 and an elastic assembly 110 configured inside the box body 111. In this embodiment, the power boxes 11 are vertically arranged in the housing 101, which allows better connection with the driving mechanism 20 and avoids interference with the adjustment mechanism 50. Compared to the horizontal arrangement of the power boxes in the conventional configuration, this vertical arrangement simplifies the connection structure and is more suitable for larger venetian blinds 1000.

The driving mechanism 20 includes a driving rod 21 and a driving assembly 22 interlinked together. The driving rod 21 successively passes through each power box 11, and the driving rod 21 is interlinked with multiple elastic assemblies 110. The winding mechanism 30 is configured to roll up the driving cord 102, and connected to the driving assembly 22 and linked to the power boxes 11 through the driving rod 21. The positioning mechanism 40 is movably installed in the housing 101 and allows the slats 200 to be positioned at any desired position. The adjustment mechanism 50 is configured to adjust the angle of the slats 200.

In operation, when the slats 200 are pushed or pulled, the driving cord 102 is configured to wind on or unwind from the winding mechanism to fold or unfold the slats 200. The winding mechanism 30 is configured to drive the driving assembly 22 to move and drive the driving rod 21, so as to drive the elastic assemblies 110 on the driving rod 2111 to be tightened or loosened elastically. Specifically, the elastic assemblies 110 provide an elastic force equal to the weight of the stacked slats 200. When the slats 200 are pulled downward, the driving cord 102 is actuated, and the winding mechanism 30 rotates to release the driving cord 102 and the slats 200. At the same time, under the pulling action, the winding mechanism 30 drives the driving rod 21 to rotate through the driving assembly 22, and the multiple elastic assemblies 110 move with the driving rod 21. The elastic force released by the multiple elastic assemblies 110 is always equal to the weight of the stacked slats 200 at the bottom. Moreover, when pulling the slats 200, the driving cord 102 is acted on the positioning mechanism 40, and continues moving downward by overcoming the elastic force of the positioning mechanism 41. The positioning mechanism 40 is cooperated with the power mechanism 10 to position the slats 200 at any position when the force acting on the slats 200 is released. When the slats 200 are pushed upward, the total elastic force of the elastic assemblies 110 and the total weight of the slats 200 are unbalanced, and total elastic force of the elastic assemblies 110 is greater than the total weight of the slats 200. As a result, the driving rod 21 and the reel 31 connected to the driving assembly 22 are driven to rotate under the elastic force of the second elastic member 114, thereby rolling up the driving cord 102 and raising the slats 200. The top rail mounting assembly 100 of the present invention is compact and easy to operate.

Figure 5:
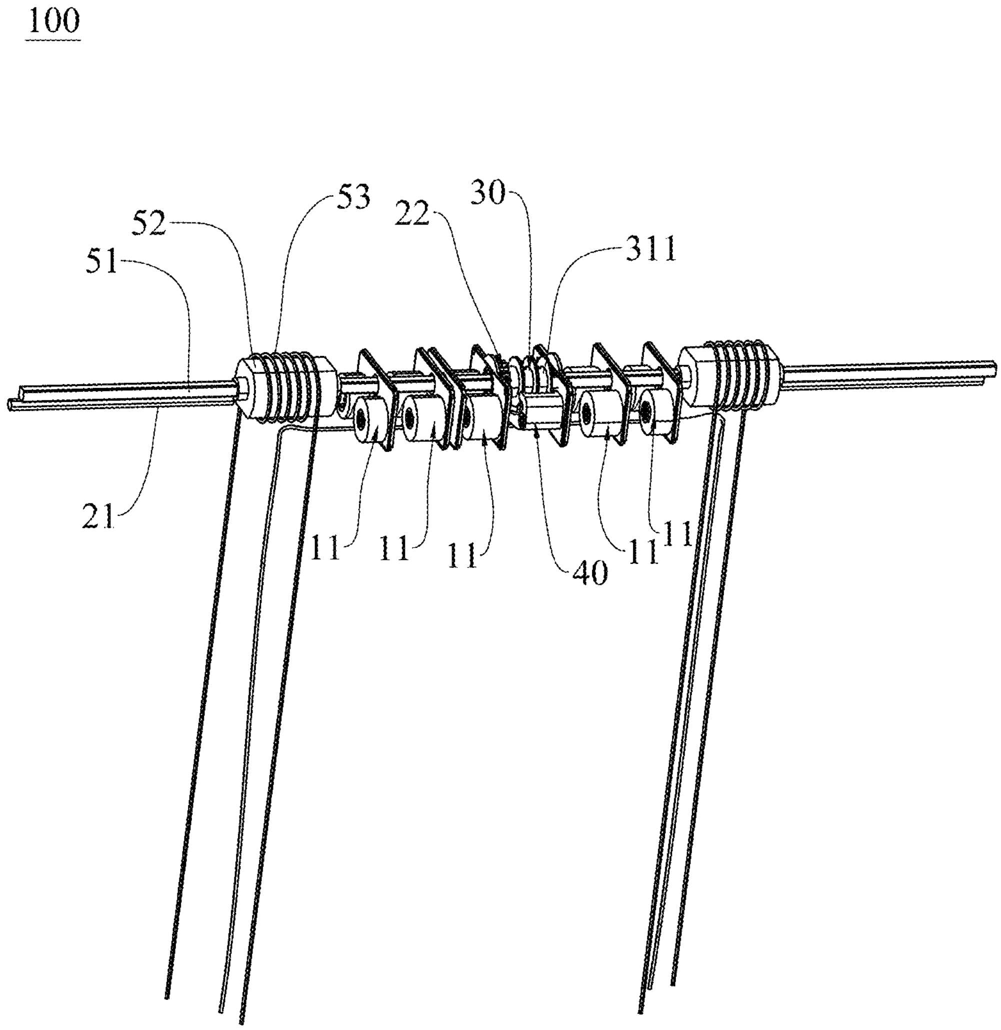
FIG. 5 is another view of FIG. 3.
Figure 6:
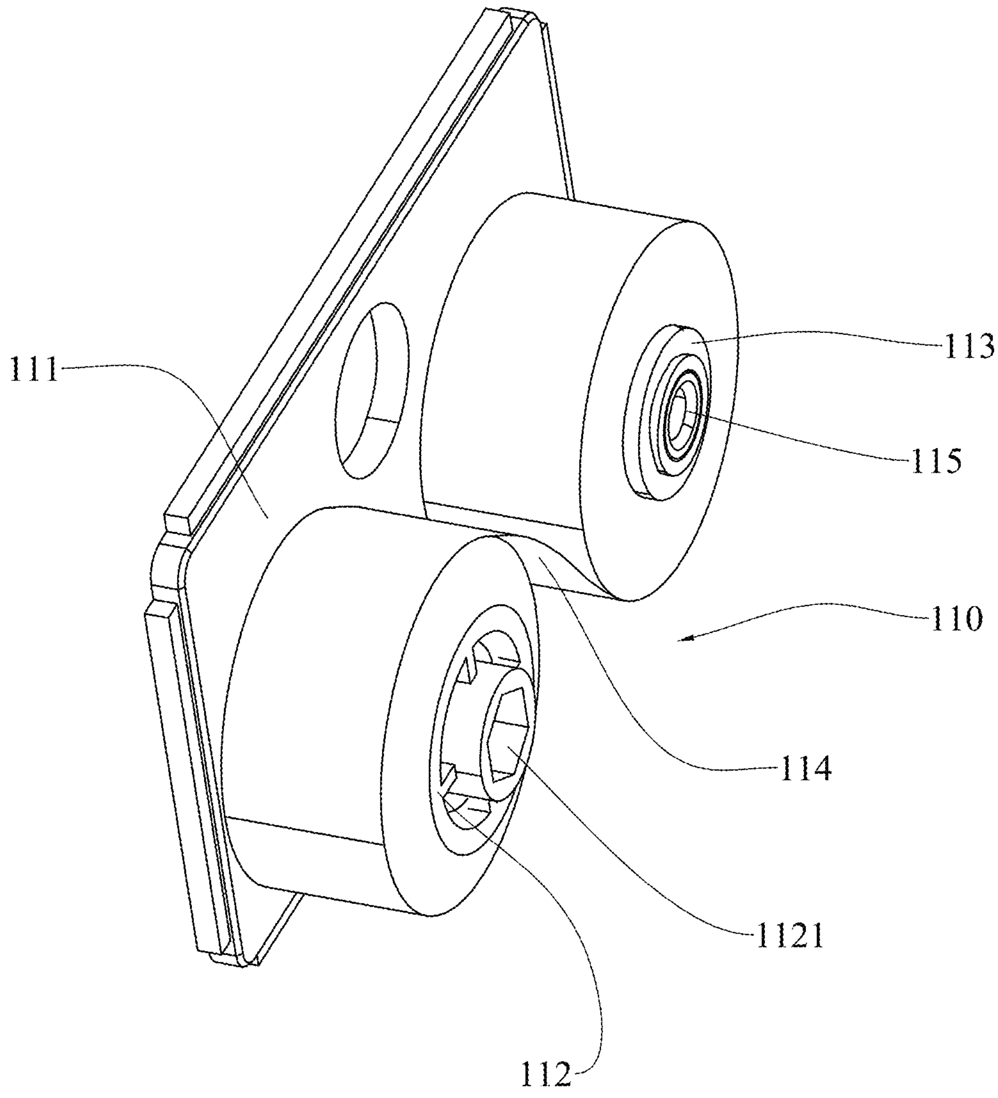
FIG. 6 is an internal structural diagram of the power box in FIG. 3.
Figure 7:
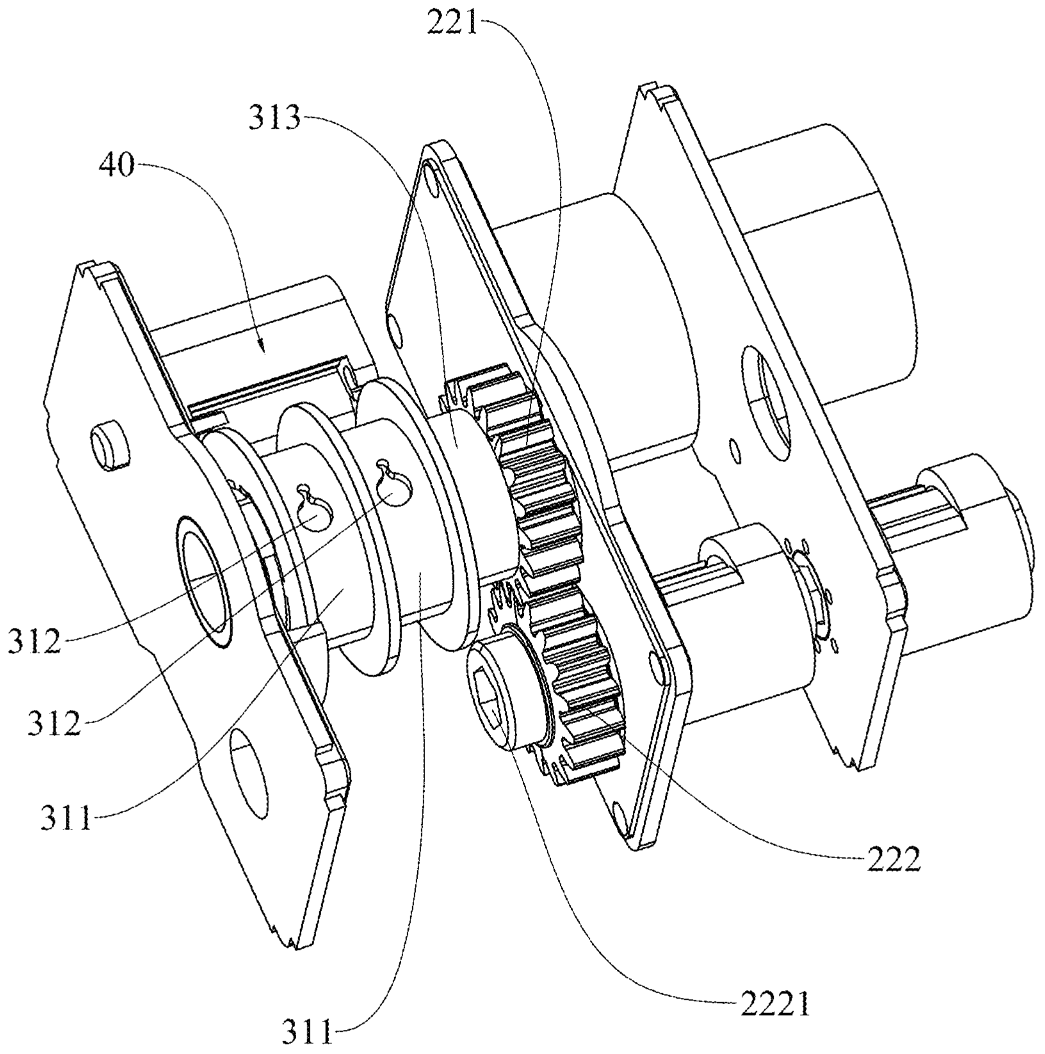
FIG. 7 is a structural diagram of the cooperation between the reel and the driving assembly in FIG. 3.
Figure 9:
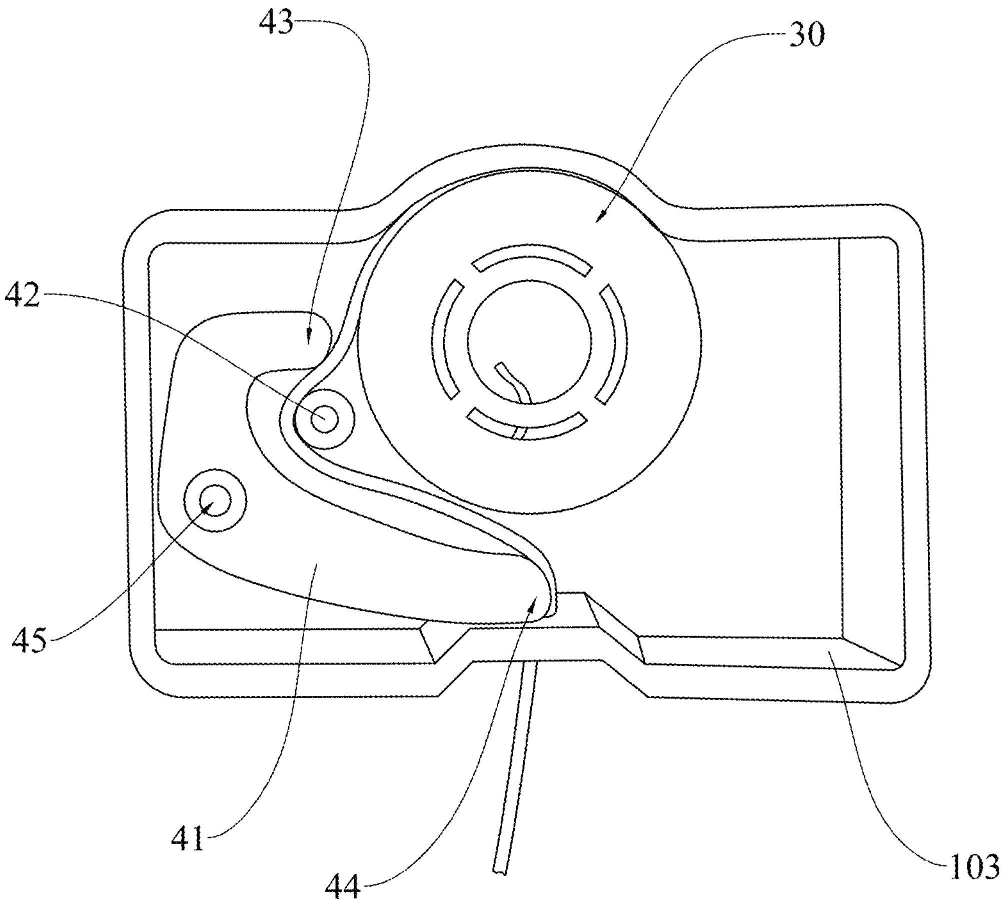
FIG. 9 is a structural diagram of the positioning mechanism in FIG. 3.
Figure 10:
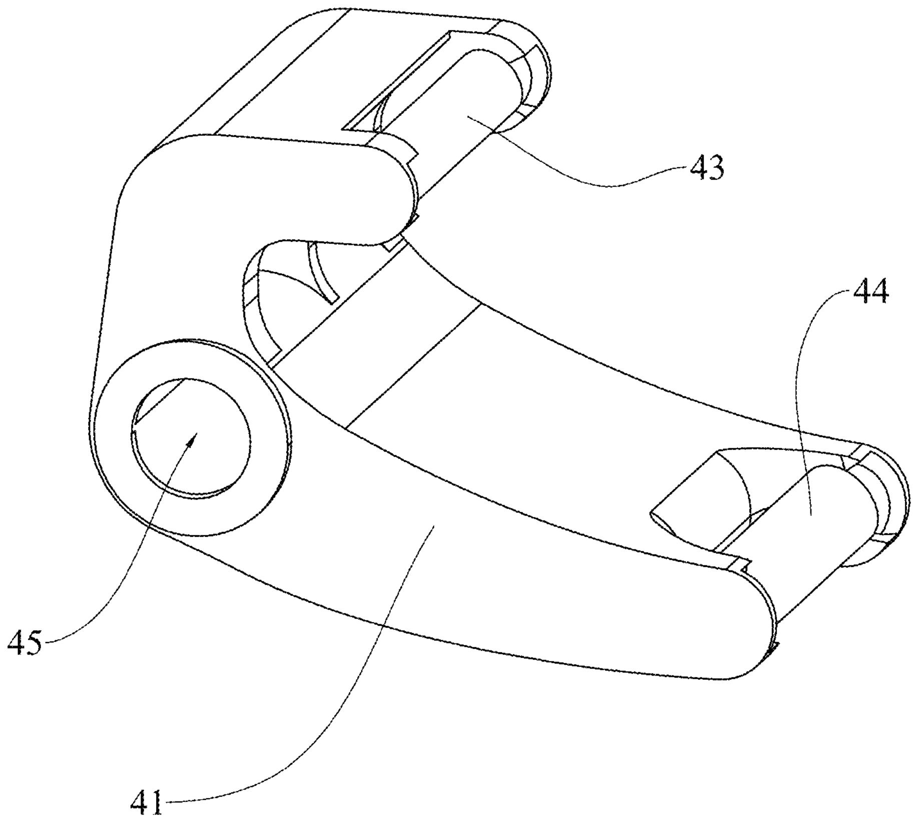
FIG. 10 is a structural diagram of the cooperation between the positioning member and the first and second rotating members in FIG. 9.

Referring to FIGS. 5, 9, and 10, in some optional embodiments, the positioning mechanism 40 cooperates with the power mechanism 10 to position the slats 200 at any desired position. The positioning mechanism 40 includes a positioning member 41, a guiding wheel 42, a first rotating member 43, and a second rotating member 44. The first rotating member 43 is rotatably disposed at one end of the positioning member 41, and the second rotating member 44 is rotatably disposed at the other end of the positioning member 41. The first rotating member 43 and the second rotating member 44 may be arc-shaped surfaces integrally formed with the positioning member 41. Specifically, the positioning member 41 is installed inside the housing 101 to form a cavity, and the guiding wheel 42 is installed inside the cavity. The first rotating member 43 is located on one side of the guiding wheel 42, and the second rotating member 44 is located on the other side of the guiding wheel 42. The driving cord 102 inside the winding mechanism 30 successively passes through the first rotating member 43 at one end of the positioning member 41, the guiding wheel 42, and the second rotating member 44 at the other end of the positioning member 41, and then connects to the multiple slats 200.

Referring to FIGS. 5, 9, and 10, in some optional embodiments, a first elastic member 45 is provided inside the positioning member 41, which allows the positioning member 41 to have a constant tendency to move closer to the winding mechanism 30 through the first elastic member 45. Specifically, when the slats 200 are pulled down, the slats 200 overcome the elastic force of the first elastic member 45 to move downward. When the force acting on the slats 200 is withdrawn, the first elastic member 45 drives the positioning member 41 to reset and increases the resistance to the downward movement of the driving cord 102 and the slats 200. At the same time, due to the connection between the reel 31 and the multiple power boxes 11, the elastic assemblies 110 inside the power boxes 11 always release an elastic force equal to the weight of the slats 200 stacked below. By coordinating the positioning member 41 with the multiple power boxes 11, the positioning member 41 can minimize the downward inertia of the slats 200 when they are released, thereby allowing the slats 200 to be positioned at any position.

Referring to FIGS. 3-5, 7 and 8, in some optional embodiments, the winding mechanism 30 includes a shell 103 and a reel 31 vertically installed inside the shell 103. Compared to the conventional reel, the reel 31 in the present invention is placed vertically, which allows the driving cords 102 on both sides to wind around the reel 31 without height difference, thereby resulting in better consistency of winding movement and more synchronous folding and unfolding of the slats 200 at both ends. Specifically, the reel 31 is rotatably disposed between adjacent box bodies 111 and inside the shell 103. One end of the reel 31 is provided with a mounting part 313. The driving assembly 22 includes a first gear 221 and a second gear 222 meshed with one another. The first gear 221 is sleeved on the mounting part 313 and is interlinked with the reel 31, and the second gear 222 is sleeved on the driving rod 21. Specifically, when the slats 200 are pulled down, the reel 31 rotates to release the driving cord 102, and the mounting part 313 rotates with the reel 31, thereby driving the first gear 221 to rotate. The first gear 221 engages and drives the second gear 222, which in turn drives the driving rod 21 to rotate, causing the elastic assemblies 110 inside the multiple power boxes 11 to act and maintain the same weight as the stacked slats 200 below. Alternatively, when the slats 200 are pushed up, the elastic assemblies 110 drive the driving rod 21 to rotate, causing the second gear 222 on the driving rod 21 to engage and drive the first gear 221, which in turn drives the reel 31 to rotate and roll up the driving cord 102, thereby allowing the slats 200 to fold.

Figure 8:
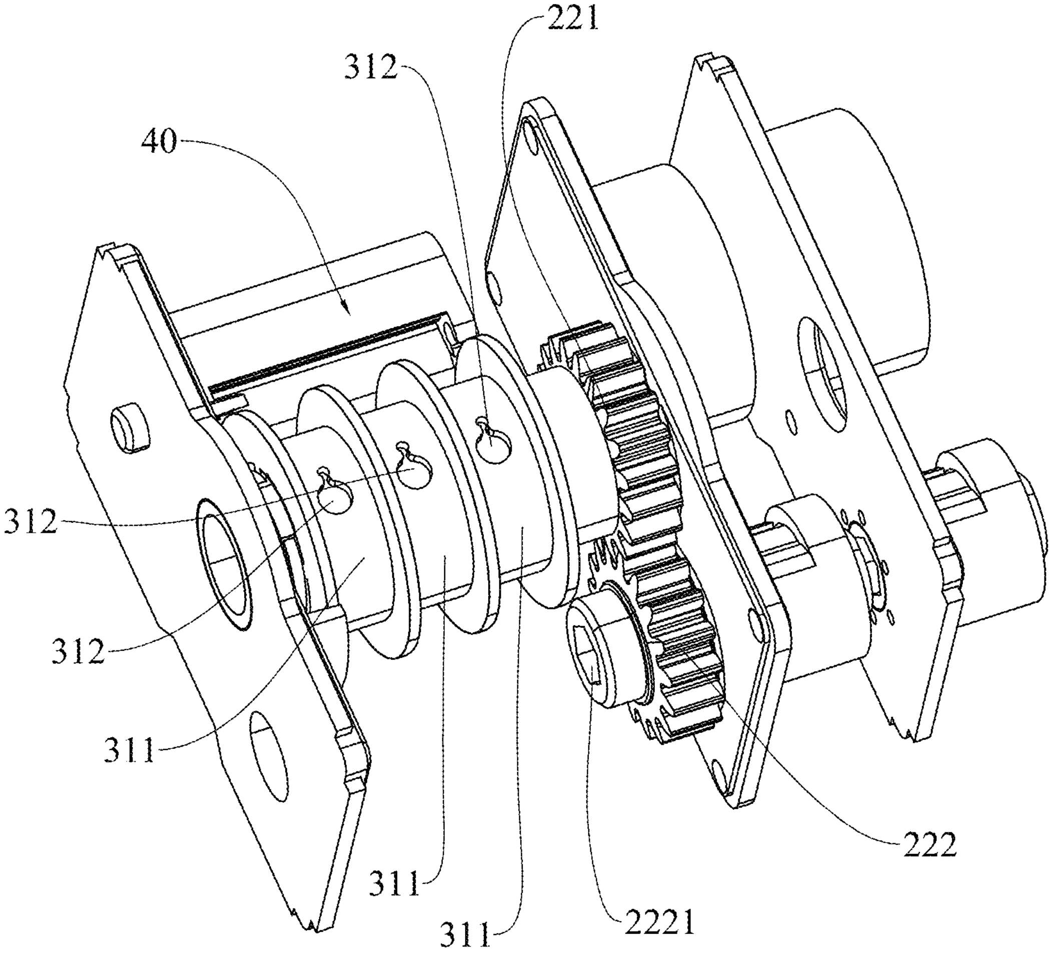
FIG. 8 is a structural diagram of the cooperation between the reel and the driving assembly according to another embodiment of the present invention.

Referring to FIGS. 3 to 5 and FIGS. 7 and 8, in some optional embodiments, the reel 31 may include multiple reel sections 311, each of which can be used to wind and unwind the driving cord 102. Specifically, each reel section 311 is provided with an installation hole 312 for the driving cord 102 to pass through. One end of the driving cord 102 is fixed inside the reel 31 and passes through the installation hole 312 and is wound around the reel section 311, and then the driving cord 102 passes through the positioning mechanism 40 and connects to the multiple slats 200. The number of reel sections 311 is at least two, with each reel section 311 connected to the driving cords 102 on each side, thereby allowing the two ends of the blinds 1000 to move symmetrically. As shown in FIG. 8, the number of reel sections 311 may be three. When the area and the size of the blind 1000 is larger, it is necessary to increase the driving cords 102 connected to the slats 200 in order to achieve better movement of the blind 1000 as a whole. Accordingly, the additional reel sections 311 are used to wind and unwind the additional driving cords 102. Of course, the number of reel sections 311 may also be four, five, or any other suitable number, depending on actual usage. In some embodiments, multiple reels 31 may be installed inside the housing 101, which are cooperated with the driving mechanism 20 to facilitate the folding and unfolding of the blind 1000.

Referring to FIGS. 3 to 5 and FIGS. 7 and 8, in some optional embodiments, the driving rod 21 is provided with a first engaging portion 211, and the driving assembly 22 is provided with a second engaging portion 2221 that cooperates with the driving rod 21. Each first rotating member 112 is provided with a third engaging portion 1121 that cooperates with the first engaging portion 211. By coordinating the first engaging portion 211 with the second engaging portion 2221 and the third engaging portion 1121, the multiple power boxes 11 can be linked with the driving mechanism 20. In this embodiment, the driving rod 21 is a multi-sided rod, and the second gear 222 inside the driving assembly 22 is provided with a cavity that matches the multi-sided rod, so that the second gear 222 is linked with the multi-sided rod. Each first rotating member 112 is also provided with a cavity that matches the multi-sided rod, so that each elastic assembly 110 can be linked with the multi-sided rod.

Referring to FIGS. 3 to 6, in some optional embodiments, each elastic assembly 110 includes a first rotating member 112, a second rotating member 113, and a second elastic member 114, all of which are installed inside the housing 101. One end of the second elastic member 114 is connected to the first rotating member 112, and the other end of the second elastic member 114 is connected to the second rotating member 113. The first rotating member 112 is sleeved on the driving rod 21 and linked with the driving rod 21, while the second rotating member 113 is rotatably installed inside the housing 101. A fixed part 115 is provided inside the housing 101, and the second rotating member 113 is rotatably sleeved on the fixed part 115. The rotation of the first rotating member 112 and the second rotating member 113 allows the second elastic member 114 to be wound on the first rotating member 112 or the second rotating member 113. In this embodiment, the second elastic member 114 may be a spring. The second elastic member 114 has a constant tendency to drive the first rotating member 112 and the driving rod 21 to reset. When the slats 200 are pulled or pushed, the winding mechanism 30 winds or unwinds the slats 200, and the first rotating member 112 rotates to tighten or release the second elastic member 114, and the elastic force released by the second elastic members 114 is always equal to the weight of the stacked slats 200 below. Specifically, when the slats 200 are pulled down, the reel 31 rotates to release the driving cord 102, and the reel 31 drives the first gear 221 to rotate. Accordingly, the first gear 221 engages and drives the second gear 222, which in turn drives the driving rod 21 to rotate, causing the first rotating member 112 to rotate and roll up the second elastic member 114. The elastic force released by the multiple second elastic members 114 is maintained equal to the weight of the stacked slats 200 below. When the pulling force acting on the slats 200 is withdrawn, the slats 200 is maintained in the appropriate position under the resistance of the positioning mechanism 40. On the other hand, when the slats 200 are pushed upward, the multiple second elastic members 114 are wound onto the second rotating member 113, and the driving rod 21 is driven to rotate, so that the second gear 222 on the driving rod 21 engages and drives the first gear 221, which in turn drives the reel 31 to rotate and roll up the driving cord 102, thereby folding the slats 200. When the push force acting on the slats 200 is withdrawn, the elastic force released by the multiple second elastic members 114 always remains equal to the weight of the stacked slats 200 below, thereby allowing the slats 200 to be stayed in the appropriate position.

Referring to FIGS. 2 to 5, in some optional embodiments, an adjustment mechanism 50 for adjusting the angle of the slats 200 is further included. The adjustment mechanism 50 is configured to rotate the slats 200. Specifically, the adjustment mechanism 50 includes an adjustment rod 51, a rotation part 52, and a connecting rope 53. Both ends of the adjustment rod 51 are respectively provided with a rotation part 52, and each rotation part 52 is connected to the multiple slats 200 via the connecting rope 53. The adjustment rod 51 passes through the winding mechanism 30 and multiple power boxes 11, and does not interfere with the winding mechanism 30 and the multiple power boxes 11. In this embodiment, both the power boxes 11 and the reels 31 are vertically installed inside the housing 101, which optimizes the use of space and allows for more power boxes 11 to be placed. The vertically placed power boxes 11 can be better connected to the driving mechanism 20 for synchronized movement, making it suitable for larger blinds 1000.

In conclusion, as shown in FIGS. 1 to 10, the blind 1000 of the present invention include a top rail mounting assembly 100, a driving cord 102, a connecting rope 53, and multiple slats 200. The top rail mounting assembly 100 is particularly suitable for larger blinds 1000. The top rail mounting assembly 100 includes a housing 101, a power mechanism 10, a driving mechanism 20, a winding mechanism 30, a positioning mechanism 40, and an adjustment mechanism 50, all of which are installed inside the housing 101. The power mechanism 10 includes multiple power boxes 11 arranged in a predetermined direction inside the housing 101, each power box 11 includes a box body 111 and an elastic assembly 110 installed inside the box body 111. The driving mechanism 20 includes a driving rod 21 and a driving assembly 22 that are interconnected. The driving rod 21 passes through multiple power boxes 11, and multiple elastic assemblies 110 are linked to the driving rod 21. The winding mechanism 30 is used to wind and unwind the driving cords 102, and connected to the driving assembly 22 and linked to the power boxes 11 through the driving assembly 22 and the driving rod 21. The positioning mechanism 40 is movably installed inside the housing 101 and works in coordination with the power mechanism 10 to position the slats 200 at any position. The adjustment mechanism 50 is used to adjust the angle of the slats 200. Specifically, the driving cords 102 are wound around the winding mechanism 30, pass through the positioning mechanism 40, and connect to multiple slats 200. The driving assembly 22 includes a first gear 221 and a second gear 222 that engage with each other. The first gear 221 is connected to the winding mechanism 30, and the second gear 222 is connected to the driving rod 21. Multiple elastic assemblies 110 are linked to the driving rod 21. When the slats 200 are pulled down, the driving cord 102 pulls the slats 200 and the reel 31 to rotate to release the driving cord 102 and the slats 200 connected to the driving cord 102. At the same time, under the pulling action, the winding mechanism 30 drives the driving rod 21 to rotate through the driving assembly 22, and the elastic assemblies 110 move with the driving rod 21. The first rotating member 112 on the driving rod 21 winds up the second elastic member 114, and the elastic force released by the second elastic members 114 is always equal to the weight of the stacked slats 200 below. When the slats 200 are pulled down, the driving cord 102 acts on the positioning mechanism 40, overcoming the elastic force of the positioning piece 41 to continue moving downward. The positioning mechanism 40 works in coordination with the power mechanism 10, allowing the slats 200 to be positioned at any position when the force is withdrawn. On the other hand, when the slats 200 are pushed up, the total elastic force of the multiple second elastic members 114 and the total weight of the slats 200 are unbalanced, and the elastic force of the second elastic members 114 is greater than the weight of the slats 200. As a result, the driving rod 21 and the reel 31 connected to the driving assembly 22 are driven to rotate, which allows the driving cord 102 to be rolled up and the slats 200 to be folded up. The top rail mounting assembly 100 of the present invention allows the slats 200 to be easily folded and unfolded, and the slats 200 can be positioned at any suitable position. The top rail mounting assembly 100 of the present invention is suitable for larger blinds 1000, allowing the slats 200 of the blinds 1000 to be easily folded and unfolded, and the arrangement of the power boxes 11 does not interfere with the adjustment mechanism 50, resulting in a compact and reasonable overall structure.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A top rail mounting assembly, adapted for a blind, the blind comprising a driving cord and multiple slats connected to the driving cord, and the top rail mounting assembly comprising:

a power mechanism, comprising multiple power boxes arranged in a housing in a predetermined direction, each power box comprising a box body and an elastic assembly configured inside the box body;

a driving mechanism, comprising a driving rod and a driving assembly interlinked together, and the driving rod passing through each power box which is interlinked with the driving rod;

a winding mechanism for winding the driving cord, connected to the driving assembly and interlinked with the power boxes through the driving assembly and the driving rod; and a positioning mechanism, movably installed inside the housing;

wherein when the slats are pushed or pulled, the driving cord is configured to wind on or unwind from the winding mechanism to fold or unfold the slats, the winding mechanism is configured to drive the driving assembly to move and drive the driving rod, causing the elastic assembly on the driving rod to be tightened or loosened elastically, and an elastic force released by the elastic assembly is constantly equal to a weight of the slats stacked below;

wherein the positioning mechanism comprises a guide wheel and a positioning member, one end of the positioning member is provided with a first rotating member, and another end of the positioning member is provided with a second rotating member, the first rotating member is located on one side of the guide wheel, and the second rotating member is located on another side of the guide wheel;

wherein the driving cord inside the winding mechanism successively passes through the first rotating member, the guiding wheel, and the second rotating member, and then connects to the multiple slats.

2. The top rail mounting assembly according to claim 1, wherein the positioning member is provided with a first elastic member and has a constant tendency to move closer to the winding mechanism; when a force is applied to the slats to pull the slats, the slats overcome an elastic force of the first elastic member and move downward; when the force acting on the slats is withdrawn, the first elastic member drives the positioning member to reset and increases a resistance to a downward movement of the driving cord and the slats; and the positioning member is configured to cooperate with the power boxes to allow the slats to be positioned at any position.

3. The top rail mounting assembly according to claim 2, wherein the positioning member is installed inside the housing to form a cavity.

4. The top rail mounting assembly according to claim 1, wherein the winding mechanism comprises a shell and a reel vertically and rotatably installed inside the shell, one end of the reel is provided with an installation part, the driving assembly comprises a first gear and a second gear meshed with one another, the first gear is sleeved on the installation part and interlinked with the reel, and the second gear is sleeved on the driving rod.

5. The top rail mounting assembly according to claim 4, wherein the reel comprises multiple reel sections, and each reel section is provided with an installation hole for the driving cord to pass through, one end of the driving cord is fixed inside the reel and passes through the installation hole and winds around the reel sections, then passes through the positioning mechanism, and finally connects to multiple slats.

6. The top rail mounting assembly according to claim 1, wherein the elastic assembly comprises a first rotating member, a second rotating member, and a second elastic member respectively arranged inside the housing; one end of the second elastic member is connected to the first rotating member, and another end of the second elastic member is connected to the second rotating member; the first rotating member is sleeved on the driving rod and interlinked with the driving rod, the second rotating member is rotatably installed inside the housing, and the second elastic member constantly tends to reset the first rotating member and the driving rod; by pushing or pulling the slats, the winding mechanism is configured to fold or unfold the slats, the first rotating member is configured to the second elastic member, and an elastic force released by second elastic member is always equal to the weight of the slats stacked below.

7. The top rail mounting assembly according to claim 6, wherein the housing is provided with a fixed part, and the second rotating member is rotatably sleeved on the fixed part.

8. The top rail mounting assembly according to claim 1, further comprising an adjustment mechanism for adjusting an angle of the slats, wherein the adjustment mechanism comprises an adjustment rod, a rotation part, and a connecting rope, both ends of the adjustment rod are provided with the rotation part, the rotation part is connected to the slats through the connecting rope, the adjustment rod passes through the winding mechanism and the power boxes, and does not interfere with the winding mechanism and the multiple power boxes.

9. A blind, comprising multiple slats connected to each other through a driving cord and a connecting rope, and the top rail mounting assembly according to claim 1, wherein the driving cord and the connecting rope are connected to the top rail mounting assembly, the top rail mounting assembly is configured to control the driving cord to fold or unfold the slats, and control the connecting rope to rotate the slats.

* * * * *